(12) United States Patent
Grangette

(10) Patent No.: US 6,268,044 B1
(45) Date of Patent: Jul. 31, 2001

(54) HEAT-SHRINKABLE POLYETHYLENE FILM OF HIGH CLARITY WHICH IS EASY TO OPEN FOR THE WRAPPING OF GROUPS OF PRODUCTS

(75) Inventor: Michel Grangette, Versailles (FR)

(73) Assignee: Societe de Conditionnement et Industrie Societe Anonyme Ceisa, Bernay (FR)

( * ) Notice: Subject to any disclaimer, the term of this patent is extended or adjusted under 35 U.S.C. 154(b) by 0 days.

(21) Appl. No.: 09/291,076

(22) Filed: Apr. 14, 1999

(30) Foreign Application Priority Data

Apr. 15, 1998 (FR) .................................................. 98 04689

(51) Int. Cl.⁷ ............................ B32B 27/32; B65B 53/02
(52) U.S. Cl. ......................... 428/213; 428/349; 428/516; 428/520; 428/910
(58) Field of Search .................................... 428/910, 515, 428/516, 520, 34.9, 213

(56) References Cited

U.S. PATENT DOCUMENTS

| | | | |
|---|---|---|---|
| 4,532,189 | 7/1985 | Mueller | 428/516 |
| 4,820,557 | 4/1989 | Warren | 428/34.9 |
| 4,856,656 | 8/1989 | Sugimoto et al. | 206/523 |
| 5,300,353 | * 4/1994 | Yoshimura et al. | 428/213 |
| 5,604,043 | * 2/1997 | Ahlgren | 428/518 |
| 6,074,715 | * 6/2000 | Lind et al. | 428/35.4 |

FOREIGN PATENT DOCUMENTS

| | | |
|---|---|---|
| 810166478 | 10/1981 | (JP) . |
| 8300084995 | 5/1983 | (JP) . |
| WO98/21276 | 5/1998 | (WO) . |

* cited by examiner

*Primary Examiner*—Paul Thibodeau
*Assistant Examiner*—D. Lawrence Tarazano
(74) *Attorney, Agent, or Firm*—O'Keefe Egan & Peterman, LLP

(57) ABSTRACT

The film according to the invention comprises a central layer, representing at least 30% of the total thickness of the film, composed of a mixture comprising at least 50% by weight of radical polyethylene and of ionomeric plastic, the remainder being conventional linear polyethylene, sandwiched between two outer layers composed of a mixture comprising more than 50% by weight of linear polyethylene, the remainder being radical polyethylene. Application: in the wrapping of groups of products.

15 Claims, No Drawings

HEAT-SHRINKABLE POLYETHYLENE FILM OF HIGH CLARITY WHICH IS EASY TO OPEN FOR THE WRAPPING OF GROUPS OF PRODUCTS

The present invention generally relates to heat-shrinkable polyethylene films for the wrapping of groups of products, such as bottles, for example of mineral water or of fruit juice, metal cans, for example beer cans or cans of other drinks, or cartons, for example of milk or of other drinks, and more particularly heat-shrinkable polyethylene films of high clarity which are easy to open.

Heat-shrinkable polyethylene wrapping films are conventionally produced by monoextrusion or coextrusion by means of an extrusion-blow molding machine. The polyethylene film is extruded in an annular die and is swollen in order to form a polyethylene bubble which is subsequently flattened in order to be wound-up.

The film thus obtained is subsequently used to wrap up groups of products. The film is then positioned around the group of products to be wrapped and the assembly is subsequently placed in an oven at an appropriate temperature for the film to shrink around the products of the group in order to grip it and to give it cohesion.

Three types of heat-shrinkable polyethylene film currently exist for wrapping.

The first type of film or standard film is composed of one or more mono- or coextruded layers of polyethylene polymerized by the radical route (radical polyethylene).

The standard films exhibit the disadvantage of being weakly transparent and difficult to open.

To overcome this disadvantage, so-called "high clarity" heat-shrinkable polyethylene films, obtained by coextrusion, have been produced. These "high clarity" polyethylene films are three-layer composite films comprising a central layer, predominantly composed of radically catalyzed polyethylene, sandwiched between two, very glossy, special polyethylene layers predominantly comprising either linear polyethylenes obtained by conventionally catalyzed (conventional linear polyethylenes) or linear polyethylenes obtained by metallocene catalyzed synthesis (metallocene linear polyethylenes)

The outer glossy layers of the "high clarity" films generally comprise from 80 to 90% by weight, with respect to the weight of the polymers, of conventionally catalyzed or metallocene catalyzed linear polyethylene and the central layer comprises more than 50% by weight, with respect to the total weight of the polymers, of standard radical polyethylene.

The thicknesses of the various layers are generally as follows:

The central layer generally represents 50% or more of the total thickness of the film.

Although these "high clarity" films exhibit a high transparency and a high gloss, they remain, however, difficult to open.

Furthermore, heat-shrinkable polyethylene films for wrapping, known as "easy to open", have been produced by mono- or coextrusion. These films exhibit, along their length or their width or in both directions simultaneously, a weak or weakened resistance to tear propagation (Elmendorf) with respect to the standard and "high clarity" films.

These films are characterized by the presence in the composition of one or more layers of an ionomer in particular of ionomers derived from ethylene copolymers.

Such ionomers are sold under the trademarks and trade names Surlyn® by the Company Du Pont de Nemours, Iotec® by Exxon Chemicals and Innovex® by the Company BP Chemicals.

In the case of three-layer coextruded films, the existing films exhibit the following configurations:

One of the outer layers is composed of a mixture of ionomers and of polyethylenes or the central layer and an external layer are composed of a mixture of ionomers and of polyethylenes, the remaining layers being composed solely of polyethylenes.

The central layer is composed of a pure ionomers and the outer layers are composed of polyethylenes or the central layer is composed of polyethylenes and the two outer layers are composed of pure ionomer.

These easy-to-open films exhibit the disadvantage of lacking clarity.

The subject-matter of the present invention is therefore a heat-shrinkable polyethylene film for the wrapping of groups of products which is simultaneously of high clarity and easy to open.

A film is called "high clarity" when its gloss, measured according to DIN Standard 67530, is greater than 90% with an angle of 20° and when its haze, measured according to ASTM Standard D 1003, is less than 2%.

A film is called easy to open when the resistance to tear propagation in the transverse direction according to NF Standard G 03011 is less than 120 cN. Furthermore, the propagation of this tear in the transverse direction must be steady and relatively rectilinear.

According to the invention, the heat-shrinkable film comprises a central layer sandwiched between two outer layers, wherein:

the central layer is composed of a mixture of radical catalyzed polyethylene, of conventionally catalyzed linear polyethylene and of at least one ionomers plastic, the radically catalyzed polyethylene and the ionomer representing 50% by weight or more of said mixture and said central layer representing at least 30% of the total thickness of the film; and the outer layers, which are identical or different, are composed of a mixture of radically catalyzed polyethylene and of conventionally catalyzed and/or metallocene catalyzed linear polyethylene, the conventionally catalyzed and/or metallocene catalyzed linear polyethylene representing more than 50% by weight of the mixture.

In the central layer, the radically catalyzed polyethylene or polyethylenes generally represent from 20 to 80%, preferably 30 to 70% and better still 40 to 60% by weight of the mixture.

The radical polyethylenes are well known products which are commercially available. These polyethylenes have a relative density generally of between 0.918 and 0.930.

The ionomer or ionomers generally represent 10 to 70%, preferably 10 to 50% and better still 20 to 30% by weight of the mixture.

The ionomers recommended in the present invention are those derived from ethylene copolymers, for example copolymers of ethylene and of methacrylic acid in the partial sodium or zinc salt form.

Such ionomers are commercially available, for example under the trademarks and trade names: Surlyn® (Surlyn® DH1, Surlyn® SEP870) by the Company Du Pont de Nemours, Iotek® by the Company Exxon and Innovex® (EXP 5059) by the Company BP Chemicals.

In the central layer, the content of radical polyethylene and of ionomeric plastic must be at least 50% by weight of the mixture of polymers in order to obtain sufficient thermal shrinkage of the film.

The content of radically catalyzed polyethylene and ionomer will preferably be between 50 and 90% and better still 60 to 80% by weight of the mixture of polymers.

Likewise, in order to obtain sufficient shrinkage of the film, the central layer has a thickness at least equal to 30%, preferably 50 to 80% and better still of the order of 60% of the total thickness of the film.

The polyethylene films generally have a total thickness of between 25 and 80 μm.

The outer layers can be identical or different in composition but are generally identical in composition.

As indicated above, these outer layers are composed of a mixture of polyethylenes comprising more than 50% by weight, with respect to the mixture, of conventionally catalyzed and/or metallocene linear catalyzed polyethylene. The mixture generally comprises from 50% to 90%, better still of the order of 80%, by weight of linear polyethylene. The remainder of the mixture is composed of radically catalyzed polyethylene.

The conventionally catalyzed and metallocene catalyzed linear polyethylenes are known products which are commercially available. The conventionally catalyzed linear polyethylenes have a relative density generally of between 0.915 and 0.930 and the metallocene catalyzed linear polyethylenes a relative density of 0.918 to 0.927, preferably 0.918 to 0.920.

The mixtures of the various layers can also comprise any adjuvant conventionally used in ordinary preparations, such as, for example, processing aids, such as fluorinated elastomers (in a proportion of 100 ppm or more, generally 500 ppm), antistatic agents and slip agents.

Processing aids are ingredients which are well known in the technology of polyethylenes and which have the aim of facilitating the extrusion of linear polyethylenes and of preventing the orange peel phenomenon by smoothing the surface of the film.

Slip agents are also conventional ingredients which have the aim of lowering the coefficient of friction of the film. Mention may be made, among these slip agents, of erucamides.

Mention may be made, among antistatic agents, of ethoxylated amines.

EXAMPLE

A three-layer heat-shrinkable polyethylene film is produced by coextrusion and the compositions and thicknesses of the layers are shown below:

| | Composition, % by weight | |
| --- | --- | --- |
| | Central layer | Outer layers |
| Conventionally Catalyzed Linear PE, 1201 XV (Exxon) | 20 | 80 |
| Radical catalyzed PE, 3020 F (PCD) | — | 20 |
| Radical PE, FC 40 (Polimeri) | 60 | — |
| Ionomer, Surlyn ® (Du Pont de Nemours) | 20 | — |

The ratios of the thicknesses of the outer layers and of the central layer are 20%/60%/20%.

The film has a total thickness of 60 μm.

The gloss and the haze were measured in accordance with the DIN and ASTM standards mentioned above.

The results are given below.

Gloss: 20°-95–110%

Haze: <2% (illuminant D65)

The resistance to tear propagation of the film was measured.

The result is given below:

Resistance to tear propagation:

(NF G 03011) 110 cN

The results show that a film of "high clarity" which is easy to open is obtained.

What is claimed is:

1. A heat-shrinkable polyethylene film comprising a central layer sandwiched between two outer layers, wherein:

the central layer is composed of a mixture of radically catalyzed polyethylene, of conventionally catalyzed linear polyethylene and one ionomer, the radically catalyzed polethylene and the at least representing at least 50% by weight of the one mixture and said central layer representing at least 30% of the total thickness of the film; and the outer layers, which are identical or different, are composed of a mixtures of radically catalyzed polyethylene and of conventionally catalyzed and/or metallocene catalyzed linear polyethylene, the linear polyethylene representing more than 50% by weight of the mixture.

2. A film as claimed in claim 1, wherein, in the central layer, the ionomer represents from 10 to 70% by weight of the mixture.

3. A film as claimed in claim 1, wherein the ionomer is an ionomeric ethylene copolymer.

4. A film as claimed in claim 1, wherein, in the central layer, the radically catalyzed polyethylene represents 20 to 80% by weight of the mixture.

5. A film as claimed in claim 1, wherein, in the central layer, the mixture comprises 50 to 90% of radically catalyzed polyethylene and of ionomer.

6. A film as claimed in claim 1, wherein the central layer has a thickness of 50 to 80% of the total thickness of the film.

7. A film as claimed in claim 1, wherein the outer layers comprise from 50 to 90% by weight, with respect to the weight of the mixture, of linear polyethylene.

8. A group of products which are wrapped by means of a heat-shrunken film, the film being as defined in of claim 1.

9. A film as claimed in claim 1, wherein, in the central layer, the ionomer represents from 10 to 50% by weight of the mixture.

10. A film as claimed in claim 1, wherein, in the central layer, the ionomer represents from 20 to 30% by weight of the mixture.

11. A film as claimed in claim 1, wherein, in the central layer, the radically catalyzed polyethylene represents 30 to 70% by weight of the mixture.

12. A film as claimed in claim 1, wherein, in the central layer, the radically catalyzed polyethylene represents 40 to 60% by weight of the mixture.

13. A film as claimed in claim 1, wherein, in the central layer, the mixture comprises 60 to 80% of radically catalyzed polyethylene and of ionomer.

14. A film as claimed in claim 1, wherein, the central layer has a thickness of about 60% of the total thickness of the film.

15. a film as claimed in claim 1, wherein, the outer layers comprise about 80%, by weight, with respect to the weight of the mixture, of linear polyethylene.

* * * * *

UNITED STATES PATENT AND TRADEMARK OFFICE
CERTIFICATE OF CORRECTION

PATENT NO. : 6,268,044 B1
DATED : July 31, 2001
INVENTOR(S) : Michel Grangette

It is certified that error appears in the above-identified patent and that said Letters Patent is hereby corrected as shown below:

<u>Column 4,</u>
Line 15, delete "and one," and insert -- and at least one --.
Line 16, delete "polethylene" and insert -- polyethylene --.
Line 16, delete "at least," and insert -- ionomer --.
Line 17, delete "one."
Line 44, delete "of."

Signed and Sealed this

Twenty-fifth Day of June, 2002

Attest:

JAMES E. ROGAN
Attesting Officer  Director of the United States Patent and Trademark Office